Dec. 7, 1965   R. A. MAYNE   3,221,398
METHOD OF MANUFACTURING A TURBINE TYPE BLOWER WHEEL
Filed Jan. 25, 1961   2 Sheets-Sheet 1

INVENTOR.
Robert A. Mayne, Deceased
BY Ruth D. Mayne
Executrix
By Dybvig & Dybvig
HER ATTORNEYS Dec. 7, 1965  R. A. MAYNE  3,221,398
METHOD OF MANUFACTURING A TURBINE TYPE BLOWER WHEEL
Filed Jan. 25, 1961  2 Sheets-Sheet 2
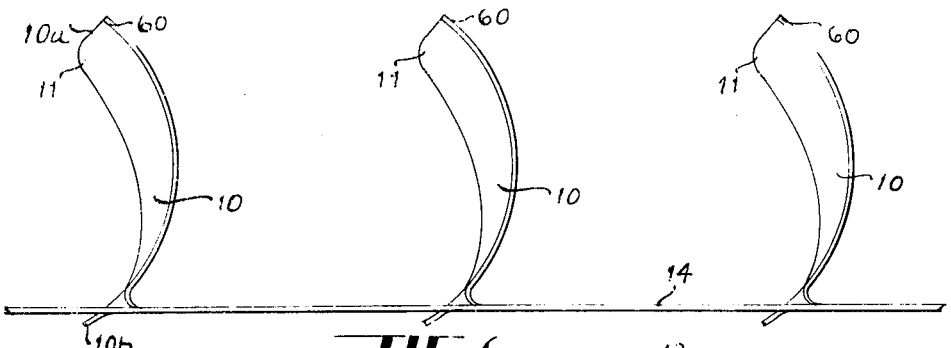
FIG. 6
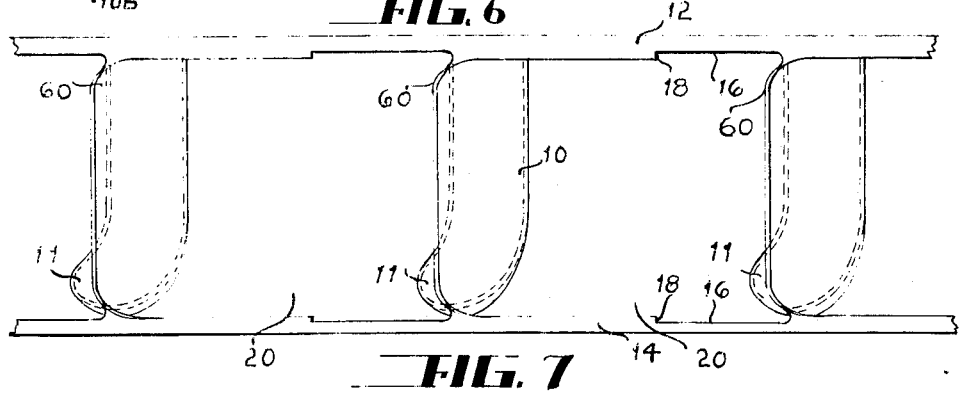
FIG. 7
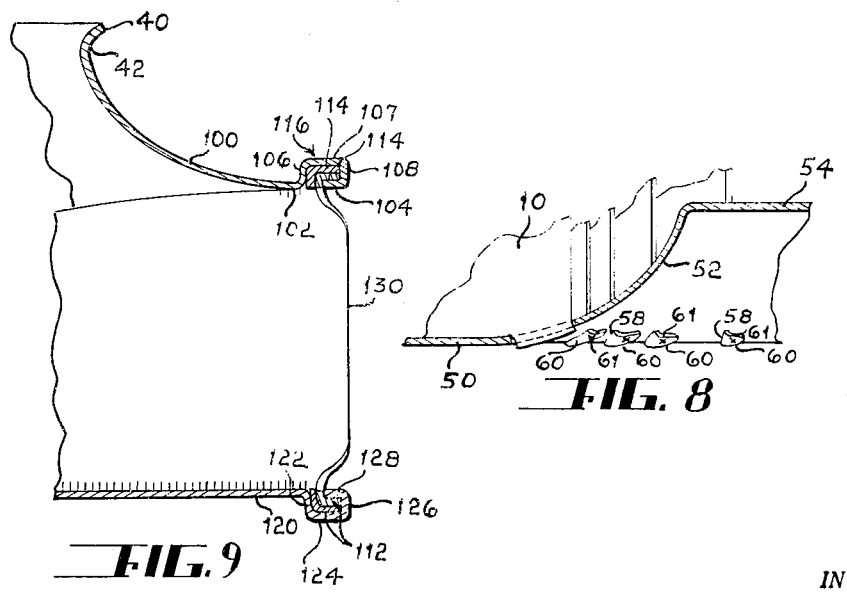
FIG. 8
FIG. 9
INVENTOR.
Robert A. Mayne, Deceased
BY Ruth D. Mayne
  Executrix
By [signature]
HER ATTORNEYS United States Patent Office 3,221,398
Patented Dec. 7, 1965

3,221,398
METHOD OF MANUFACTURING A TURBINE
TYPE BLOWER WHEEL
Robert A. Mayne, deceased, late of Oakwood, Ohio, by
Ruth D. Mayne, executrix, 42 W. Forrer Road, Oakwood, Ohio
Filed Jan. 25, 1961, Ser. No. 84,959
5 Claims. (Cl. 29—156.8)

This invention relates to a turbine type blower wheel and the method of manufacturing the same, wherein the blades and the supporting structure for the blades are made from sheet metal, although not necessarily so limited, in that other sheet materials may be used, as for example, certain types of plastic sheet material.

All object of this invention is to provide a blower wheel made from sheet material, wherein the blades are struck out of one or more sheets of sheet material and when more than one sheet is used, the blades of the different sheets are interleaved and equally spaced, a frustum-conical member flaring inwardly away from the blades being attached to one margin and forming the intake opening of the blower wheel, and a backing sheet having the inner portions of the blades attached thereto for closing the opposite side of the blower wheel, said backing sheet being attached to the marginal portion supporting the blades.

Another object of this invention is to provide a turbine type blower wheel wherein the blades are struck from two or more sheets, the major portion of the blades being directed inwardly, the blades of one sheet being interleaved with other blades, so that the blades are equally spaced throughout the periphery of the blower wheel, the radial length of the blades being much greater than the width of the sheet from which the blades are formed, the inner ends of the blades being secured to a backing disc, so as to hold the inner ends of the blades in position, each of the blades having a portion thereof opposite the portion of the blade attached to the center disc curved, so as to form a propeller portion for drawing the air into the blower wheel, the radial portion of the blower wheel propelling the air radially.

Another object of this invention is to provide a method of making a blower wheel, wherein the blades are formed out of two sheets, the radial length of the blades being much greater than the width of the sheets, the greater portion of the blades being directed inwardly from the sheets, securing the inner ends of the blades to a supporting member, and securing a frustum-conical member forming an intake opening to one margin of the sheets integral with the blades.

Other objects and advantages reside in the construction of parts, the combination thereof, the method of manufacture and the mode of operation, as will become more apparent from the followiing description.

Referring to the drawings, FIGURE 1 is a perspective view of a turbine type blower wheel.

FIGURE 2 is a cross sectional view, taken substantially on the line 2–2 of FIGURE 1.

FIGURES 3, 4 and 5 are cross sectional views, taken substantially on the section lines 3—3, 4—4 and 5—5 respectively, of FIGURE 1.

FIGURE 6 is a side elevational view of a fragmentary portion of a strip of material having the blades struck therefrom.

FIGURE 7 is a top plan view of the fragmentary portion of the strip of material shown in FIGURE 6, having the blades struck therefrom.

Figure 1:
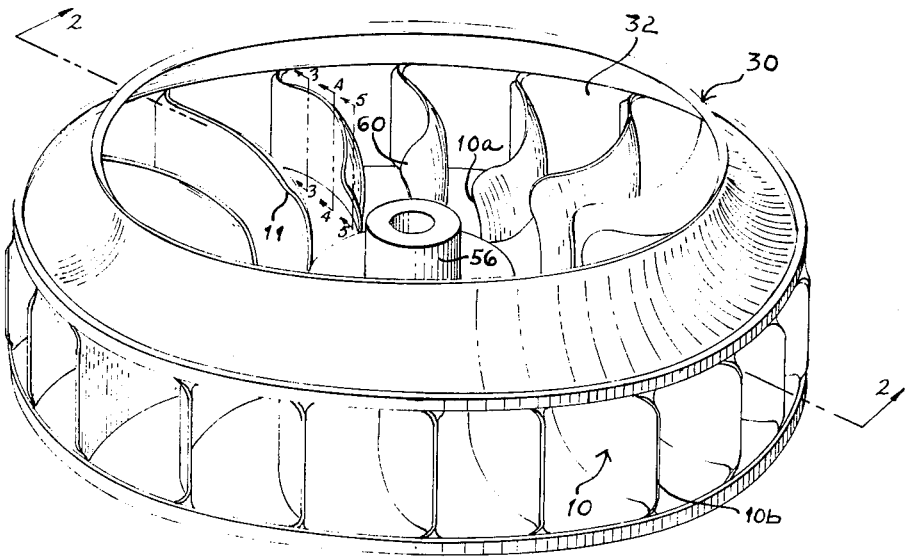

FIGURE 8 discloses a fragmentary rear view of the frustum-conical portion of the backing disc or support.

FIGURE 9 discloses a fragmentary view of a modification.

In the drawings, FIGURE 7 discloses a top plan view of a strip of sheet material having blades 10 struck or cut out of and formed from the material between the blades. That is, the blades are struck or formed from the sheet cut from the openings 20, one blade being formed into a concavo-convex contour from the material cut from each opening.

Marginal strips 12 and 14 are integral with the blades and extend around the peripheral margins of the blower wheel. The ends of the marginal strips are welded together, so as to form a pair of closed marginal cylindrical rims. Notches 16, forming shoulders 18, are used in positioning the two strips or sheets with the blades formed therein, such that when assembled the blades of one strip or sheet engage the shoulders 18 of the other strip. This is similar to the positioning of the two strips of material used in the manufacture of the Blower Wheel shown in the Mayne copending application Serial No. 543,867 now Patent No. 2,982,468.

The radial length of each blade 10 is much greater than the width of the strips. The radial length may be approximately one and one-half times the width of the strips and the width of the blades may be on the order of one-half the radial length of the blades. This ratio depends upon the desired output of the blower wheel. In part, it is determined by the number of blades used in a blower wheel. For example, in a blower wheel substantially 9 inches in diameter, 18 blades may be used, 9 blades being struck or formed from one sheet of material and the other 9 blades struck or formed from a second sheet of material.

Figures 3, 4, 5:
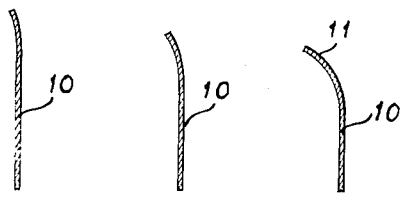

As may be seen from a comparison of the shape of the blade shown in FIGURES 3, 4 and 5, the transverse curvature of the blade increases gradually from the vicinity of the section line 3–3 towards the inner tip or corner 11 of the blade, as shown by the cross section shown in FIGURE 5 taken on the section line 5–5. This results in the outer margins of the inner portions of the blades functioning in a manner similar to propeller blades, drawing the air axially towards the blower wheel, then the main body of the blade 10 propelling the air radially outwardly between the openings found between adjacent blades. As may best be seen by referring to FIGURE 6, each blade has a concavo-convex surface from the inner margin 10a of the blade to the outer margin 10b thereof.

Figure 2:
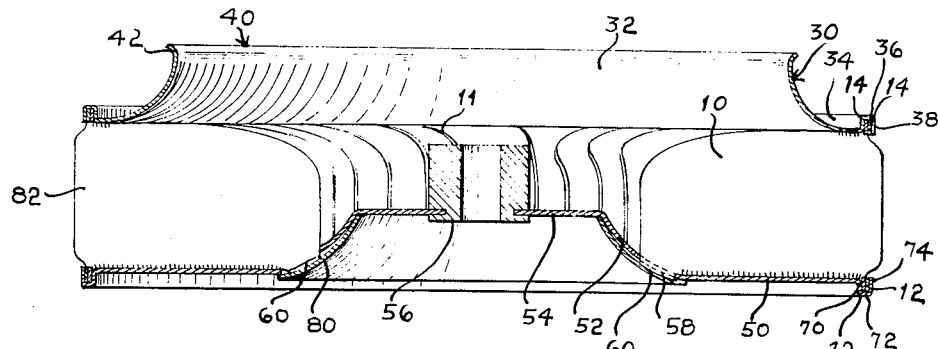

As clearly shown in FIGURES 1 and 2, a frustum-conical member 30 with a center opening 32 has the outer margin enveloping the marginal strips 14 integral with the blower blades. This has been accomplished by providing an axially formed flange 34, a radial flange 36 and a second axial flange 38, that may be referred to as a reentrant flange, for snugly clamping the margins 14 to the frustum-conical intake member 30.

The margin 40 of the apex of the frustum-conical member is curved at 42, so as to function as a Venturi for drawing the air surrounding the opening of the frustum-conical member forming the intake opening of the blower wheel. By providing the curved portion 42, the air is not only drawn in radially, but also diagonally beyond the inner periphery of the frustum-conical member 30. It is to be noted that near the outer marginal portion of the frustum-conical member 30, the frustum-conical member forms a contact with the blades to effectively propel the air radially.

The opposite marginal strips 12 are attached to a backing member or plate 50 having a frustum-conical portion 52, the apex of which merges into a center radial portion 54 having fixedly attached thereto a hub 56. The center of the radial portion may have an aperture registering with the opening of the hub. The frustum-conical portion 52 is provided with slots 58, through which the tips 60 of the blades 10 project. The inner ends of the blades projecting through the slots 58 are bent into contact with the frustum-conical portion of the backing plate or disc 50, so as to lock the tips of the blades in position. The overlapping tips 60 may be welded to the back side of the frustum-conical portion 52. This may be accomplished by spot welds 61. The outer marginal portion of member 50 is provided with an axially directed annular flange 70, a radial flange portion 72 and a reentrant annular axially directed flange portion 74, the flanges 70 and 74 rigidly clamping the margins 12 of the two strips integral with the blower blades, so as to form a rigid support. The flanges 70, 72 and 74 are similar to the flanges 34, 36 and 38 of the frustum-conical member 30.

It may be necessary at spaced intervals to weld, by any suitable welding process, the flanges 34, 36 and 38 to the marginal strips 14 and to weld the flanges 70, 72 and 74 to the marginal strips 12. In the event the blower is to be used in a concealed position where noise may not be particularly objectionable, the structure as described thus far may be used. Where the noise should be held at a minimum, a frustum-conical member 80 may underlie the frustum-conical portion 52, so as to hold the tips 60 in position and so as to present a smooth surface on the rear of the blower wheel to eliminate noise and so as to conceal the tips 60 bent up against the frustum-conical portion 52. The frustum-conical member 80 may only underlie the frustum-conical portion of the backing member, or it may extend parallel to and coextensive with the backing member 50. If member 80 is coextensive with the backing member 50, the margin of member 80 would then envelop the marginal portion of the backing plate 50.

In forming the blades, as shown in FIGURES 1 and 2, a small marginal portion 82 projects beyond the extreme outer margins of frustum-conical portion 30 and backing plate 50. For some purposes, it may be desirable that the outer marginal portions 82 of the blades be flush with the outer margins of the frustum-conical member 30 and the backing plate 50. This has been shown in the modification disclosed in FIGURE 9.

In this modification a frustum-conical member 100, similar to the frustum-conical member 30 in the preferred embodiment, is provided with a Venturi-like opening formed by the margin 40 and the curved portion 42. However, the side 102 and the reentrant flange 104 are coplanar, so as to form a substantially continuous surface on the intake side of the blower wheel. The margins 114 of the strips from which the blades have been formed form an angle within the enclosure of the envelope-like portion 116 of member 100. The envelope-like portion 116 includes an axial flange portion 106, a radial flange portion 107, a reentrant axial flange portion 108 and a radial reentrant flange 104. Again, the parts may be welded together at spaced intervals, especially when the blower wheel is to be driven at higher speeds.

The backing disc 120 has the outer margin formed in a manner similar to the outer margin of the frustum-conical member 100. The margins 112 of the two strips from which the blades are struck are bent at an angle in a manner substantially identical to the formation of the marginal strips 114. The center of the backing disc or plate 120 is provided with a frustum-conical portion substantially the same as that disclosed in FIGURES 1 and 2, which center portion has not been shown. The outer margin of the backing disc 120 includes an axial flange portion 122, a radial flange portion 124, a reentrant axial flange portion 126 and a reentrant radial flange portion 128.

The outer margins 130 of the blades 10 and the outer surfaces of the reentrant axial flange portions 108 and 126 are located in a common cylindrical surface, so that the blades 10 do not project beyond the outer portions of the frustum-conical member 100 and the backing disc 120.

For very high speed operations, the margins of the blades in contact with the frustum-conical intake member 30 or 100 may be welded or soldered. Likewise, the margins or edges in contact with the backing disc 50 or 120 may also be welded or soldered thereto. In the event the margins of the blades are welded or soldered to the intake frustum-conical member and the backing disc, the slots 58 may be eliminated.

This blower wheel lends itself to a direct drive. In other words, the armature shaft may be secured to the hub 56, so that the blower wheel rotates at the same speed as the motor. The air will be drawn inwardly by the inner tip 11, functioning in a manner simliar to a propeller. The air is deflected into a radial pattern by the concave surface of the blades, that is, the concave surface extending from 10a to 10b. Due to the rather restricted area formed between members 30 and 50 at the outer margin of the blades, the air will escape at a comparatively high velocity. In other words, the blower wheel disclosed herein will deliver air at a high pressure and at high velocity and, at the same time, at an extremely low noise level. The assembly is easily produced, is inexpensive and at the same time efficient.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described the invention, it is claimed:

1. The method of producing a blower wheel including the steps of forming equally spaced blades from two sheets of material leaving marginal strips integral with the ends of the blades, there being a marginal strip along each side of each sheet, forming the blades into a concavo-convex shape extending transversely from the plane of the sheets, superimposing the two sheets with the blades equally spaced so that alternate blades project from one sheet and the remaining blades from the other sheet, curving the sheets into a cylindrical member with the greater portion of the blades directed inwardly, forming a frustum-conical member having the apex of the frustum-conical member open and the peripheral outer margin secured to the marginal strips of each of the two cylindrical sheets of material along one side of the blades, forming a circular backing member, securing the peripheral margin of the backing member to the other marginal strips of the sheets, and securing the blades to the backing member so as to form a blower wheel.

2. The method of producing a blower wheel including the steps of forming equally spaced blades from a plurality of sheets of material leaving marginal strips integral with the ends of the blades, there being a marginal strip along each side of each sheet, forming the blades into a concavo-convex shape extending transversely from the plane of the sheets, superimposing the sheets so that the blades of each sheet are equally spaced with respect to the adjacent blades, curving the sheets into a cylindrical formation with the greater portion of the blades directed inwardly, forming a frustum-conical member having the apex of the frustum-conical member open and the peripheral outer margin thereof secured to the marginal strips of the sheets of material along one side of the blades, forming a circular backing member, securing the peripheral margin of the backing member to the other marginal strips of the sheets, and securing the blades to the backing member so as to form a blower wheel.

3. The method of producing a blower wheel including the steps of forming spaced blades from a plurality of sheets of material leaving marginal strips integral with the ends of the blades, there being a marginal strip along each side of each sheet, forming the blades into a concavo-convex shape extending transversely from the plane of the sheets, superimposing the sheets with the blades equally spaced so that the blades of one sheet are equally spaced with respect to the adjacent blades of the other sheet, welding the marginal strips of the sheets together, curving the sheets into a cylindrical formation with the greater portion of each blade being directed inwardly, forming a frustum-conical member having the apex thereof open and the peripheral outer margin secured to the marginal strips of the cylindrical sheets of material along one side of the blades, forming a circular backing member, securing the peripheral margin of the backing member to the other marginal strips of the sheets, and securing the blades to the backing member so as to form a blower wheel.

4. The method of producing a blower wheel including the steps of forming equally spaced blades from two sheets of material leaving marginal strips integral with the ends of the blades, there being a marginal strip along each side of each sheet, forming the blades into a concavo-convex shape extending transversely from the plane of the sheets, superimposing the two sheets with the blades equally spaced so that alternate blades project from one sheet and the other blades from the other sheet, welding the marginal strips of each side of the sheets so as to hold the sheets in fixed angular relation, curving the sheets into a cylindrical formation with the greater portion of each blade being directed inwardly, forming a frustum-conical member having the apex of the frustum-conical member open and the peripheral outer margin folded over the marginal strips of the two cylindrical sheets of material along one side of the blades, forming a circular backing member, folding the peripheral margin of the backing member over the other marginal strips of the sheets so as to provide a support for the blower wheel.

5. The method of producing a blower wheel including the steps of forming equally spaced blades from two sheets of material leaving marginal strips integral with the ends of the blades, there being a marginal strip along each side of each sheet, forming the blades into a concavo-convex sheet extending transversely from the plane of the blades, superimposing the two sheets with the blades equally spaced so that alternate blades project from one sheet and the other blades from the other sheet, welding the marginal strips of each side of the sheets so as to hold the sheets in fixed angular relation, curving the sheets into a cylindrical formation with the greater portion of each blade being directed inwardly, forming a frustum-conical member having the apex of the frustum-conical member open and the peripheral outer margin folded over the marginal strips of the two cylindrical sheets of material along one side of the blades, the folded over portion of the frustum-conical member including a reentrant flange lying in substantially the same plane as the portion of the frustum-conical member adjacent the fold, forming a circular backing member, a hub secured to the center of the backing member, folding the peripheral outer margin of the backing member over the other marginal strips of the sheet with a portion of the folded portion terminating in a radial flange coplanar with the outer margin of the backing member adjacent the folded over portion so as to provide a support for the blower wheel.

References Cited by the Examiner

UNITED STATES PATENTS

| | | | |
|---|---|---|---|
| 1,094,031 | 4/1914 | Still | 230—134.45 X |
| 1,876,518 | 9/1932 | Mathis | 230—134.5 |
| 2,195,869 | 4/1940 | Rathbun | 230—134.5 |
| 2,431,647 | 11/1947 | Mayne et al. | 230—134.5 |
| 2,774,293 | 12/1956 | Jenn | 230—134.5 |
| 2,803,393 | 8/1957 | Sprouse | 230—134.45 |
| 2,925,953 | 2/1960 | Keeley | 230—134.5 |
| 2,958,459 | 11/1960 | Newton et al. | 230—134.5 |
| 2,982,468 | 5/1961 | Mayne. | |
| 3,010,187 | 11/1961 | Glasson | 29—156.8 |
| 3,021,591 | 2/1962 | Mayne et al. | 29—156.8 |
| 3,147,541 | 9/1964 | Hathaway | 29—156.8 |

FOREIGN PATENTS

| | | |
|---|---|---|
| 18,349 | 8/1910 | Great Britain. |
| 301,112 | 11/1954 | Switzerland. |

WHITMORE A. WILTZ, *Primary Examiner.*

JOSEPH H. BRANSON, JR., *Examiner.*